Patented July 28, 1953

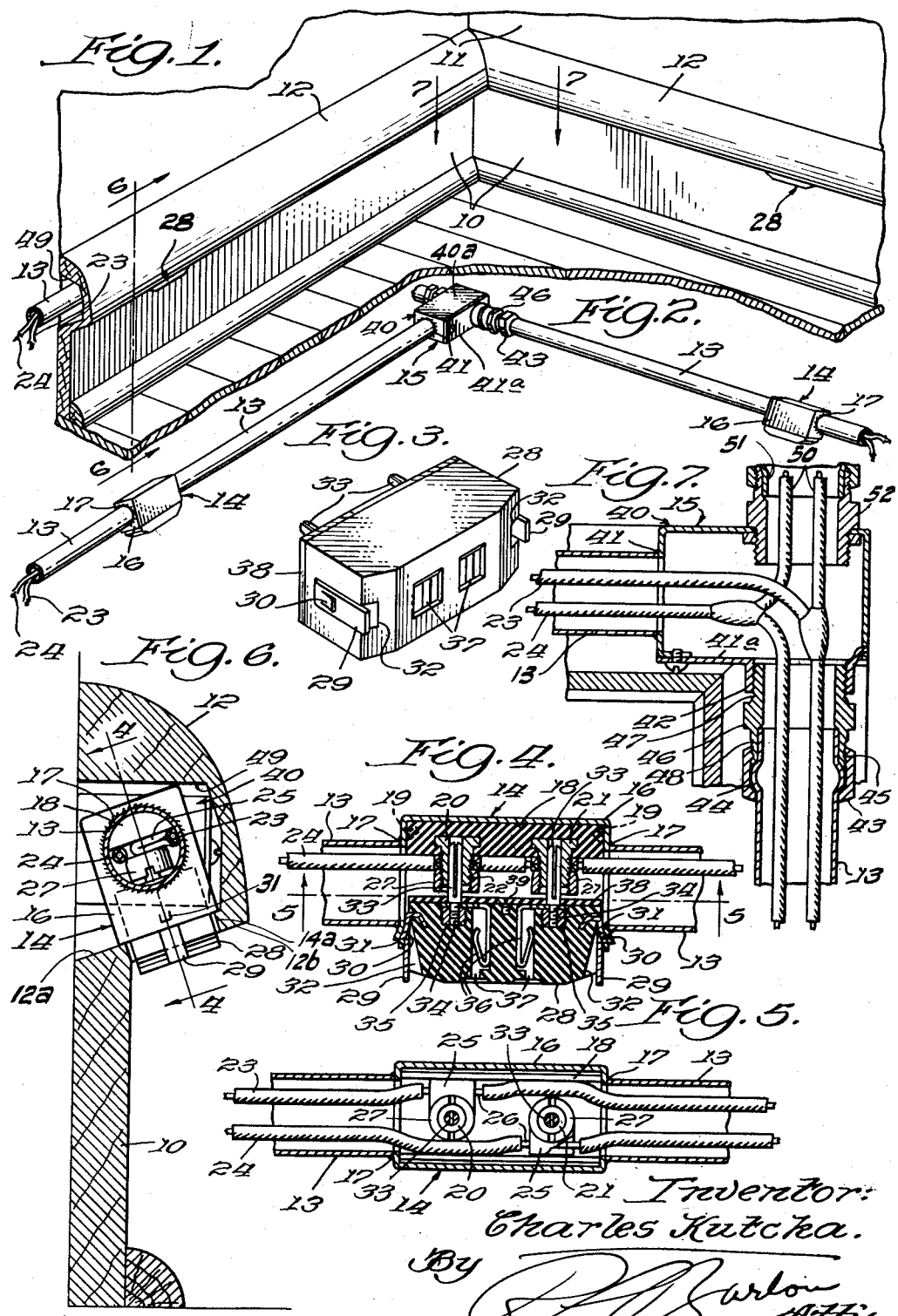

2,647,242

UNITED STATES PATENT OFFICE 2,647,242

COMBINATION FLOOR MOLDING AND ELECTRIC CONDUIT STRUCTURE

Charles Kutcka, Los Angeles, Calif.

Application May 18, 1951, Serial No. 226,978

5 Claims. (Cl. 339—23)

My invention relates to the art of electrical wiring installations in edifices, and particularly in dwellings and especially to the provision of a combination of novel molding and novel electrical installation elements concealed therein and positioned thereby.

As is generally known it is modern practice to install electrical wiring, usually in metal conduits, in the walls of rooms, and to provide electrical outlets at convenient points into which electrical equipment of various types may be plugged.

In living rooms, bedrooms, nurseries and the like in which the artistic appearance of the walls is an important consideration, electrical outlets are usually placed along the baseboards in order to avoid marring the appearance of the walls, in which position they are conveniently located for the attachment of floor lamps and the like.

The arrangement of the electrical outlets along the base of the walls, while convenient, and having the advantage of placing the outlets in relatively inconspicuous positions, nevertheless presents a hazard to young children since they may receive severe shocks caused by a child pushing metal objects into the outlets, or pulling out a connecting plug and touching both prongs thereof while the plug is still making contact.

In order to minimize the danger to children various attempts have been made to provide electrical outlets so arranged that the orifices in the outlet are covered by a plate which can be moved aside when the prongs of a connecting plug are inserted in the outlet. Such outlets are however relatively expensive and easily get out of order.

It is an object of my invention to provide a wiring system including wall outlets so arranged as to be very inconspicuous, escaping the notice of children, and also improving the appearance of the room.

Any change in the usual position of electrical wall outlets requires that consideration be given to the ready repair thereof in the new position, since the spring contact strips incorporated therein are subject to wear and to deformation due to occasional faulty engagement of the prongs of a connector plug therewith.

It is accordingly a further object of my invention to provide a wall outlet construction incorporating members carrying the contacts and detachably arranged in the wall outlet boxes so that they may be readily withdrawn from the boxes and the contacts replaced. The wall outlets of my invention therefore provide advantageous features independently of their particular position in the system of my invention.

A further consideration in providing electrical wiring systems for buildings is that the building codes of many cities require such wiring to be enclosed in metal conduits to lessen the danger of fire due to exposed wiring being short-circuited by the insulation of the wire being worn off and the bare wires coming into contact with one another or with some metal structural member.

Accordingly it is another object of my invention to provide a novel electrical wiring construction for dwellings in which electrical conduit may be utilized to aid in correctly positioning the electrical outlets in a novel position.

The usual baseboards running around the foot of the walls of rooms and behind which wiring has to be led to electrical outlets arranged in the baseboard, require to be worked to provide openings for the electrical outlets and the electric wires, which may be arranged in metal conduits positioned in the walls and have to be connected to the outlets thus consuming considerable time.

It is a further object of my invention, therefore, to provide prefabricated lengths of metal conduit with outlet boxes arranged at desired intervals therealong, and also lengths of suitably formed molding incorporating a baseboard like portion, which molding contains and conceals both the conduit and the outlet boxes, thus saving of considerable time in installation, facilitating rearrangement of electrical outlets, and providing safer and more pleasing electrical installations.

Another object of my invention is to provide an electrical wiring system for dwellings in which the molding is so formed as to space the electrical outlets a considerable distance above the floor and include an overhanging portion which conceals the wiring conduits and maintains and conceals the outlet boxes in a downwardly and outwardly inclined position in relation to the wall, the contact carrying members being detachably held in the outlet boxes and serving to hold the molding and the concealed conduit and outlet boxes together in a self supporting assembly against the walls of rooms.

Still further objects and features of my invention will hereinafter appear from the following description read with reference to the accompanying drawing which illustrates a preferred embodiment of the invention.

In the drawings—

Fig. 1 is a fragmentary perspective view of a corner of a room with electrical wiring installed in a novel manner along an overhanging portion of the molding of my invention.

Fig. 2 is a fragmentary perspective view showing the electrical wiring conduit fitted with outlets arranged and constructed according to my invention, shown separately from the molding.

Fig. 3 is a perspective view of a detachable member or fitting of the outlet boxes of my invention, drawn on a larger scale.

Fig. 4 is a cross section taken on the line 4—4 of Fig. 6 and showing the interior construction of the outlet boxes.

Fig. 5 is a cross section taken on line 5—5 of Fig. 4.

Fig. 6 is a cross section taken on line 6—6 of Fig. 1 but drawn on a larger scale.

Fig. 7 is a cross section taken on line 7—7 of Fig. 1 drawn on the same scale as Fig. 6.

Referring now to Fig. 1 the numeral 10 indicates the baseboard like portion of the improved molding extending along the foot of the walls 11 of a room. Running along the upper edge of the baseboard 10 is an overhanging portion 12 of the molding machined out to receive the electrical conduit 13 which is fitted at desired locations with outlet boxes, generally indicated at 14, of my invention, two of said boxes being shown in Fig. 2. The conduits are welded or otherwise rigidly connected to the outlet boxes to hold them in a downwardly and outwardly inclined position in relation to the wall 11.

The conduit 13 is carried round the corners of the molding by connecting members, generally indicated by 15, Fig. 2. The molding 12 and connecting members 15 are more fully described later.

Each outlet 14 comprises an outlet box 16 of metal to which the metal conduit 13 is secured, for instance, by welding or soldering as indicated at 17, Fig. 4. A terminal block 18 of insulating material is detachably fitted into the back of the box 16 and is retained therein, for instance, by means of lugs 19 instruck from the sides of the box and pressed into the side faces of the block.

A pair of tubular terminals 20, 21, are molded into the block 18 and project forwardly from the front face thereof, the outer surface of the terminals being threaded as shown at 22.

The insulated wires 23, 24, of the house wiring circuit are connected to the pair of terminals by identical clamps 25 consisting of strips of metal bent double and drilled with a hole by which the clamps are mounted on the terminals. A bared length of wire 26 is clamped between the sides of the clamps 25 and held in clamped position by nuts 27. It will be understood that one of each pair of terminals is connected to one wire 23 or 24, while the other terminal is connected to the other wire.

It will be noted that the terminal block arrangement described provides ample room for conveniently arranging the terminals and that provision is made for connecting the terminals to their respective wires in a simple manner by means readily accessible from outside the outlet box and requiring only the use of usual tools.

A contact block 28 is fitted into the front portion of each outlet box 16 and is held removably therein by strips of resilient metal 29 molded at their inner ends into each side of the block 28. Said strips 29 are provided with struck out locking lugs 30 adapted to engage firmly in recesses 31 formed by striking out a portion of the sides of the outlet box. It will be noted that the sides of the contact block 28 are recessed behind strips 29, as indicated at 32, so that by applying inward pressure simultaneously against the free ends of the strips 29, the lugs 30 thereon will be disengaged from recesses 31, enabling block 28 to be slid outwardly from the outlet box.

A pair of shouldered pins 33 is held in the contact block in alinement with the openings in the tubular terminals 20, 21. Said pins 33 are slotted inwardly from their outer ends and are slightly over-size for the openings in the tubular terminals so that they fit snugly therein when pushed into the terminals. The ends of the pins held in the contact block are reduced in diameter and threaded as shown at 34, the ends being screwed into knurled round nuts 35 molded into the contact block. Spring contact strips 36 are held in position in slots 37 in the contact block by their ends which are apertured to fit on the reduced ends of the pins, said ends being clamped between the shoulders on the pins formed at the reduced portions of the stems, and the knurled nuts 35. Slots 37 permit direct access of a pair of plug contacts with the contact strips 36.

The contact strips 36 may be backed up by a plate 38 of insulating material held against the back of the contact block by a screw 39. It will be seen that by removing member 28 from the outlet box and plate 38 from its back the contact strips 36 may be released by unscrewing pins 33 and replaced if needed.

The wiring in its conduit is carried around the corners of the room by a small rectangular junction box indicated at 40 Fig. 7. The conduit 13 is welded or soldered as indicated at 41 to one face of the box, the wires 23, 24 being brought through the opening within which the conduit is secured and taken through an opening in a cover plate 41a closing an otherwise open side of the box. Said opening is surrounded by a horizontal threaded flange 42 projecting from the plate 41a to which a length of conduit may be adjustably secured by a sleeve 43 having an inturned flange engaged with an annular projection 44 formed in the wall of the conduit near its end, and threaded at its other end as indicated at 45.

A nipple 46 is provided having a nut like surface intermediate its length and having threads 47, 48 formed at its ends by which the nipple may be connected with sleeve 44 and flange 42.

The flat upper side 40a (Fig. 2) of the junction box 40 is positioned horizontally in the molding and the box is positioned with its edges against the walls meeting the corner of the room, so that the junction box may be used as a base point from which to operate, the outlet boxes being rigidly connected through the metal conduit 13 to the junction box at a uniform angle of inclination relative to the horizontal top of the box.

It will be noted from Figs. 1 and 6 that the electrical outlets are arranged slanting downwardly and away from the overhanging portion of the molding 12 which projects inwardly of the baseboard like portion 10. The manner in which the molding 12 is formed to maintain the conduit and electrical outlets in the required position is shown in Fig. 6.

The molding may be formed from lengths of wood milled out to provide a suitable recess or passage 49 the lower edge of which provides an inclined ledge 12a extending across the upper edge of the baseboard like portion 10 throughout its length; except where it is cut away at 14a to provide for the insertion of the members 28. Also the laterally projecting part of the molding has a substantially flat downwardly facing surface portion 12b along its lower edge in which is formed the aforesaid cut away portions 14a.

It will be noted that the top wall of the recess 49 fits snugly against an upper corner of the outlet box so that upward pressure exerted in inserting a connector plug is adequately resisted.

The opening or passage 49 within the laterally projecting part 12 of the molding is also large enough to contain the connecting member or junction box 40 as shown in Fig. 6, so that the molding 12 may be simply cut to fit the length of wall and the openings 14a for the outlet member 29 cut out at the proper locations very quickly and easily.

Preparatory to assembling the conduit and applied outlet boxes in their operative relation to the room, said conduit is held in a horizontal position at the proper height from the floor, whereupon the molding is brought into a juxtaposed relation thereto to enable the workman to locate and mark the openings 14a at the proper points along the length of the molding. Thereupon the molding is withdrawn from the conduit structure and the openings 14a are formed therein. Then the molding is re-juxtaposed in relation to the wall and conduit with the openings 14a registering with the outlet boxes 14. This operation is carried around the room until the installation is completed, one or more junction boxes 40 being used with or without an opening for the point of entry of the electrical conductors to place the electric circuit in the room into electric connection with the main supply line. Considering such point of entry into the room from the main line, leads 50 are tapped off the aforesaid wires 23 and 24, said leads being extended through a length of conduit section 51, said section being secured by a coupling 52 to that side of the box which is opposite to its aforesaid cover plate 41a, in the already described manner, as shown in the lower right hand portion of Fig. 7. At corners, where there is no point of entry of outside wires, the wires 23 and 24 of the adjacent conduits will be spliced together as indicated in Fig. 7, previous to the application of the cover plate 41a and the securing of the member 43 in place, as already stated. Obviously there may be times when it will not be necessary to make the junction shown in Fig. 7. In that event the wires 23 and 24 will be connected to the adjacent outlet boxes as shown in Figs. 2 and 5.

What I claim is:

1. An electrical wiring structure for buildings comprising molding abutting the wall of a room in an overlying relation to the floor level; outlet boxes concealed by said molding and maintained in a passage therein in a downwardly and outwardly directed position in relation to said wall; there being openings in said molding registering with said outlet boxes; an electric wiring conduit supported in said molding and rigidly connected to said outlet boxes; and electric conductors extending through said conduit and said outlet boxes and connecting them in an electric circuit; said outlet boxes having side portions provided internally with recesses; and contact blocks carrying strips of resilient metal furnished with locking lugs engageable with said recesses releasably to secure said contact blocks to said boxes; said strips of resilient metal projecting through said openings and being accessible for manual flexing whereby to disengage said locking lugs from said recesses and withdraw said contact blocks through said openings.

2. The structure set forth in claim 1 and there being recesses in said contact blocks behind said strips into which the free ends of said strips are projectable when manually flexed to permit said lugs to become disengaged from the recesses which they normally occupy.

3. An electric wiring structure for buildings, comprising molding abutting the wall of a room in an overlying relation to the floor thereof, aligned electrical conduit sections concealed by said molding and extending internally therealong, outlet boxes rigidly connected between adjacent ends of said electrical conduit sections and maintained in said molding in a downwardly inclined and concealed position, terminals mounted within said boxes, electrical wiring extending through said conduit sections and connected to said terminals to include them in an electric circuit, and contact blocks detachably mounted in said outlet boxes in electrical contact with said terminals, the contacts carried by said contact blocks being engageable with the prongs of electrical connector plugs inserted into said contact blocks through downwardly facing openings in said molding through which said contact blocks are manually withdrawable during the detaching thereof.

4. The subject matter of claim 3 and said outlet boxes having side portions provided internally with recesses, and said contact blocks carrying strips of resilient metal having free end portions extending through said openings, said strips being furnished with locking lugs engageable with said recesses releasably to secure said contact carrying members to said boxes, said free end portions being manually grippable to withdraw said contact blocks through said opening as aforesaid.

5. The subject matter of claim 3 and said contact blocks each comprising a body of insulating material having molded thereinto and projecting therefrom a pair of spaced apart parallel strips of resilient material, each of said strips having a free end portion extending through said opening carrying a locking lug, and said outlet boxes each having internal recesses with which said lugs releasably interlock.

CHARLES KUTCKA.

References Cited in the file of this patent

UNITED STATES PATENTS

| Number | Name | Date |
|---|---|---|
| 414,922 | Rodman | Nov. 12, 1889 |
| 1,298,858 | Anthony | Apr. 1, 1919 |
| 1,835,251 | Wetstein | Dec. 8, 1931 |
| 2,093,677 | Hickman | Sept. 21, 1937 |
| 2,119,777 | Clayton | June 7, 1938 |
| 2,162,864 | Rugg | June 20, 1939 |
| 2,484,992 | Ginther | Oct. 18, 1949 |